Figure 4:
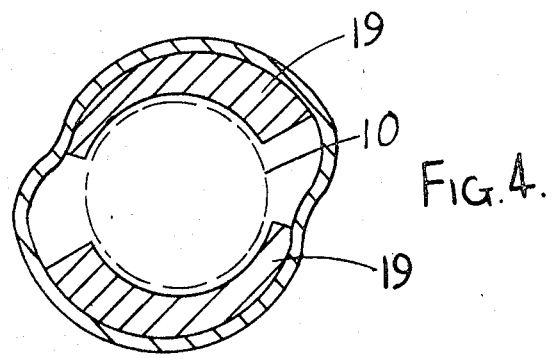

United States Patent

[11] 3,594,599

[72] Inventor John Godfrey Wilson West
 Sutton Coldfield, England
[21] Appl. No. 847,249
[22] Filed Aug. 4, 1969
[45] Patented July 20, 1971
[73] Assignee Joseph Lucas (Industries) Limited
 Birmingham, England
[32] Priority Aug. 16, 1968
[33] Great Britain
[31] 39,324/68

[54] DIRECT CURRENT DYNAMOELECTRIC MACHINES
 5 Claims, 6 Drawing Figs.
[52] U.S. Cl. ................................................. 310/258
[51] Int. Cl. ................................................. H02k 1/12
[50] Field of Search ....................................... 310/181,
 154, 155, 177, 254, 258, 190, 259

[56] References Cited
 UNITED STATES PATENTS
 2,048,161 7/1936 Klaiber ........................ 310/154

| | | | |
|---|---|---|---|
| 2,059,886 | 11/1936 | Merrill | 310/154 |
| 2,193,406 | 3/1940 | Goss | 310/154 |
| 2,513,227 | 6/1950 | Wylie | 310/154 |
| 2,993,134 | 7/1961 | Harvey | 310/154 |
| 3,054,916 | 9/1962 | Cobb | 310/154 |
| 3,296,471 | 1/1967 | Cochardt | 310/154 |

Primary Examiner—Milton O. Hirshfield
Assistant Examiner—R Skudy
Attorney—Holman & Stern ABSTRACT: A direct current dynamoelectric machine has poles in the usual way, but each pole has a first portion formed from steel and a second portion formed from ferrite material. The steel has a lower reluctance than the ferrite material, but in use the flux density is increased by armature reaction in the vicinity of the steel portion, and reduced by armature reaction in the vicinity of the ferrite portion, so that the required characteristics of the machine are obtained with a saving in material. The same effect, utilizing the armature reaction to increase flux density beneath a pole part which has a lower reluctance than the other part of the pole, can be achieved in other ways.

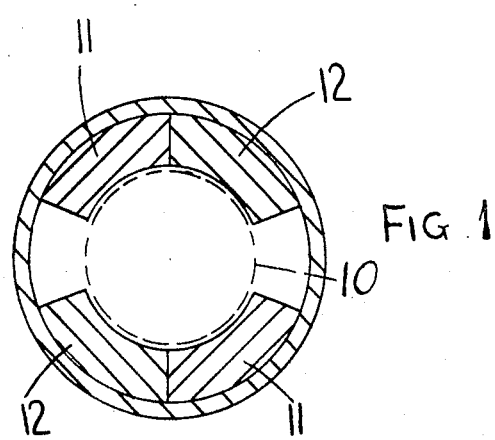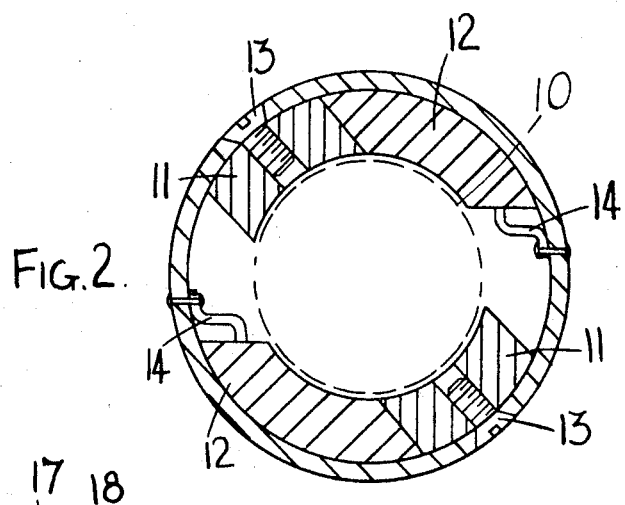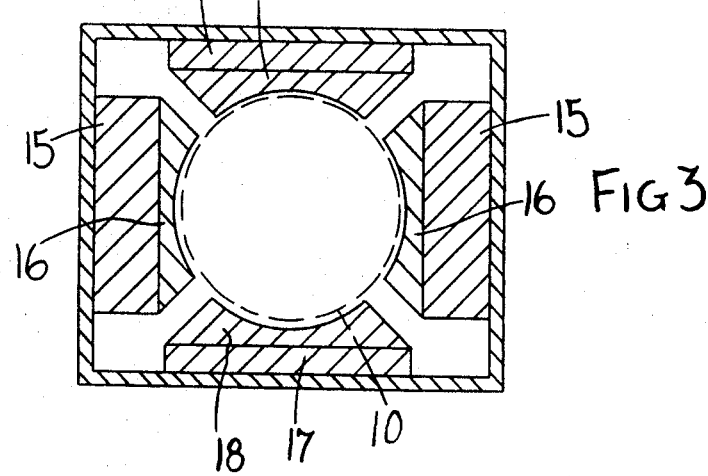

DIRECT CURRENT DYNAMOELECTRIC MACHINES

This invention relates to direct current dynamoelectric machines.

The invention resides in a direct current dynamoelectric machine in which at least a part of each pole of the machine beneath which the flux density is increased by armature reaction has a lower reluctance than the part of each pole beneath which the flux density is reduced by armature reaction.

In the case of a motor, the leading edge of each pole has the lower reluctance, whilst in the case of a generator the trailing edge of each pole has the lower reluctance.

In the accompanying drawings, FIGS. 1 to 6 respectively are sectional views illustrating six examples of the invention. For the purposes of the description it will be assumed that each of the examples is a motor.

Referring to FIG. 1, there is shown a two-pole machine in which each pole comprises two parts 11, 12, the parts 11 being formed from steel, and the parts 12 being ferrite magnets. The parts 11 may be wound. The rotor (indicated in dotted lines at 10) rotates in a clockwise direction, so that the parts 12 are on the trailing edge. The reluctance of the parts 11 is considerably lower than the reluctance of the parts 12, but the armature reaction increases the flux density beneath the parts 11 and reduces it beneath the parts 12, the design being such that a substantially even flux distribution is obtained. The design requires considerably less ferrite material than if the entire pole was formed from ferrite, and as compared with a wound machine, will require considerably fewer windings.

FIG. 2 is similar to FIG. 1 in that each of the poles includes a ferrite magnet 12 and a steel part 11. The magnets 11 are held in position by bolts 13, and the parts 12 are held in position by springs 14 urging the parts 12 against their associated magnets 11.

FIG. 3 shows another two-pole machine in which each pole comprises two portions as in FIGS. 1 and 2. However, in this case the high-reluctance portion is formed by a relatively thick ferrite magnet 15 having secured thereto a steel pole piece 16, and a relatively low-reluctance portion comprising a thinner ferrite magnet 17 and associated steel pole piece 18.

In FIG. 4 the stator is of noncircular cross section, and both poles 19 are formed entirely from ferrite. However, it will be seen that the poles 19 are shaped to present a relatively thin portion on the leading edge and a relatively thick portion of the trailing edge. In FIG. 4 the direction of rotation of the rotor is clockwise, as it is in FIG. 5 which differs from FIG. 4 in that each pole is formed from one relatively thick ferrite magnet 21 and a second relatively thin ferrite magnet 22.

Figure 5:
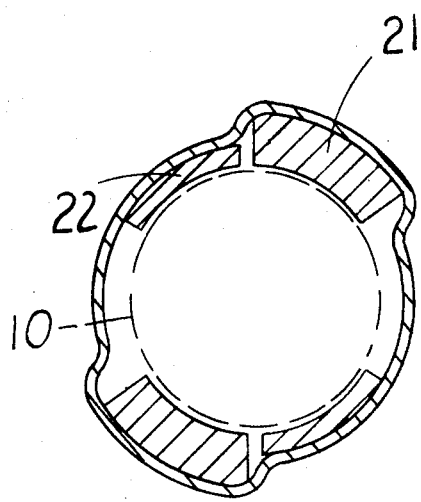
Figure 6:
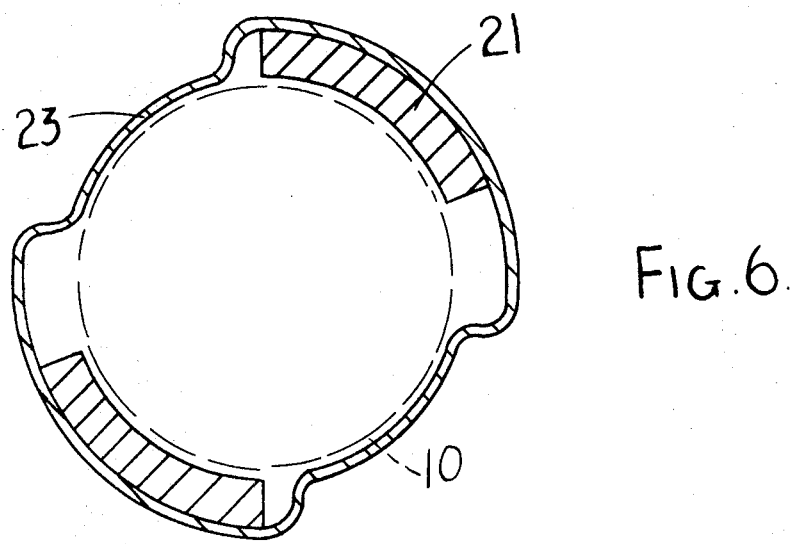

In FIG. 6, magnets 21 equivalent to those in FIG. 5 are used, but in place of the magnet 22 the actual stator is shaped as indicated at 23 to constitute the low-reluctance portion of each pole.

Having thus described my invention what I claim as new and desire to secure by Letters Patent is:

1. A direct current dynamoelectric machine having a plurality of poles, and a rotor rotating beneath said poles and producing a conventional armature reaction, each pole having a first pole part beneath which the flux density is increased by armature reaction and a second pole part beneath which the flux density is reduced by armature reaction, said pole parts being circumferentially disposed, and wherein each of said first pole parts is constructed with a lower reluctance than each of said second pole parts.

2. A machine as claimed in claim 1 in which each pole has two parts formed respectively from steel and ferrite, the steel part constituting the first pole part of each pole.

3. A machine as claimed in claim 1 in which the first pole part of each pole is formed by a ferrite magnet and associated steel pole piece, and the second pole part of each pole is formed by a thicker ferrite magnet and associated steel pole piece.

4. A machine as claimed in claim 1 in which each pole is formed entirely from ferrite material, the thickness of the ferrite material varying from a maximum to a minimum to provide the first and second pole parts of each pole.

5. A machine as claimed in claim 2 in which the steel part is constituted by the stator.